Dec. 8, 1942.   R. CROSS ET AL   2,304,749
PARASITICIDAL COMPOSITIONS CONTAINING SULPHUR
AND METHOD FOR THE PREPARATION THEREOF
Filed Nov. 26, 1941
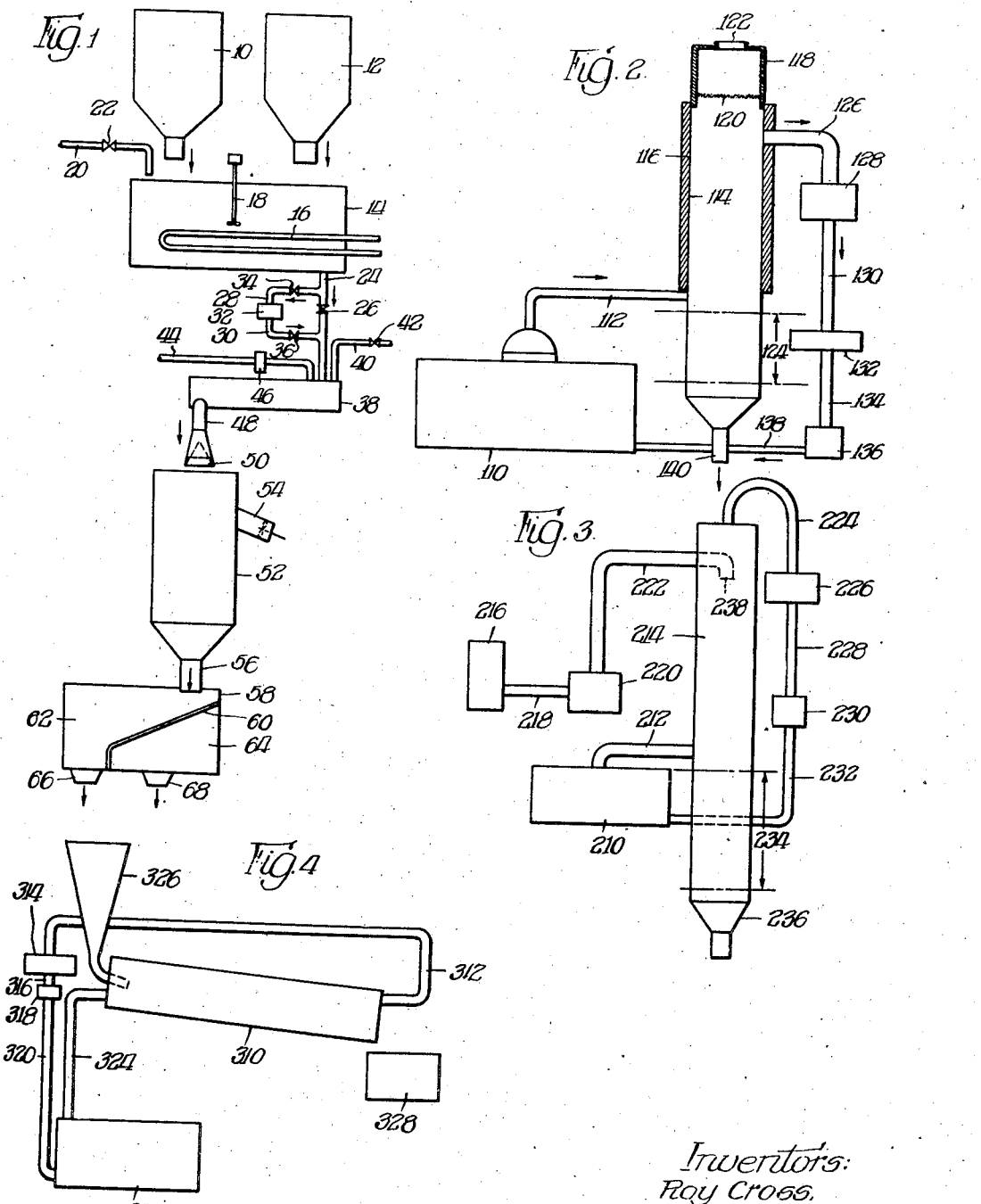
Inventors:
Roy Cross,
Mathew Forbes Cross,
Walter M Cross Jr.,
ATTORNEYS Patented Dec. 8, 1942

2,304,749

UNITED STATES PATENT OFFICE 2,304,749

PARASITICIDAL COMPOSITIONS CONTAINING SULPHUR AND METHOD FOR THE PREPARATION THEREOF

Roy Cross, Matthew Forbes Cross, and Walter M. Cross, Jr., Kansas City, Mo., assignors to Kansas City Testing Laboratory, Kansas City, Mo., a corporation of Missouri Application November 26, 1941, Serial No. 420,472

11 Claims. (Cl. 167—20)

This invention relates to the composition and manufacture of insecticides and fungicides, these two terms being included in the word "parasiticide." It more particularly refers to the type of parasiticide in which clay is incorporated as a filler, emulsifying agent or a suspending agent.

In the present art there are four general types of parasiticides, namely, (1) liquid compounds, (2) emulsions, (3) suspensions and suspendable materials, and (4) dusting materials. This invention is primarily concerned with the last three types.

The present application is a continuation in part of our co-pending application Serial No. 264,708, filed March 22, 1939, and is more particularly directed toward parasiticidal compositions containing sulphur as a parasiticidal agent.

According to present practice there is considerable difficulty in preparing emulsions of parasiticidal agents which will be stable upon storage. Soaps are frequently used for this purpose but are not entirely satisfactory for various reasons. The preparation of suspensions of active parasiticidal agents also presents a number of difficulties in the present art. Among these are the difficulty of mixing dry powders with water in a sprayer and the difficulty in supporting parasiticidal agents uniformly throughout the suspension so that when the dilute solution is sprayed, a uniform coverage will result. This difficulty is particularly bad where only a small quantity of the effective agent is being used. One of the most serious troubles presented in the present art is with mixtures using lime as a dispersing or carrying agent for the active parasiticide. Lime-sulphur sprays release lime in situ on the foliage being treated and cause serious burning effects. Furthermore, the lime-sulphur mixture reacts with the carbon-dioxide in the air to liberate hydrogen sulphide, thereby releasing sulphur to the atmosphere and depriving the foliage of its action.

In the dusting type of parasiticidal materials the comparatively high specific gravity of the filler clay prevents the obtaining of maximum efficiency. In addition to this most of the present dusting materials do not have the sticking qualities so necessary to the efficient action of the dusting powder.

Another serious disadvantage in the present art is the difficulty of obtaining a suitable intimate mixture of clay and sulphur where this type of material is used bearing in mind the fact that the sulphur must be very fine in form to become available for its appointed use.

Bentonite is one of the clays which has been suggested for use with sulphur but it has some disadvantages as compared with the materials which are hereinafter employed in accordance with the present invention. For example, a mixture of bentonite dispersed with molten sulphur is relatively difficult to grind. Furthermore, bentonite has a relatively high specific gravity of around 70 lbs. per cu. ft. Where the parasiticidal agent is a salt, bentonite is ordinarily unsuitable for mixing therewith because it is well known that bentonite will not properly disperse to a colloidal form in the presence of salts or electrolytes.

One of the objects of the present invention is to overcome these difficulties existing in the present art and to provide new and improved compositions containing parasiticidal agents and new and improved means for producing such compositions. Other objects will appear hereinafter.

The invention consists primarily of two parts, the first of which is to furnish a new material as a dispersing agent and filler for parasiticides, and the second is to provide a new method of making a mixture of a dispersing agent and a parasiticidal agent, both when mixing various agents to obtain a water suspension and to intimately combine sulphur with a sticking type of carrier.

The new material which we have discovered to be a great improvement over the present art for the production of parasiticides is a Florida-Georgia type fuller's earth which is found in northern Florida and southern Georgia in the general districts of Quincy, Florida and Attapulgus, Georgia, and in a large area in north central Florida near Ocala. A lump of this clay when added to water will not form a gel and will not swell as in the case of bentonite. Such a clay will not react with magnesium oxide as does bentonite. Its specific gravity is about 34 lbs. to 35 lbs. per cu. ft., as compared with a specific gravity of about 70 lbs. per cu. ft. for bentonite. This type of clay, furthermore, has base exchange properties and may be generally characterized as a natural zeolitic clay. When passed through a colloid mill either with or without undergoing base exchange activity, it will produce a viscous mixture with from 1% to 10% concentration in water. For example, a 4% mixture when run through a colloid mill will produce a suspension which has a viscosity of from 20 to 100 centipoises, as determined by the Stormer viscosimeter. One sample of this clay, for instance, when 4 parts thereof were mixed with 96 parts of water, gave a viscosity of 48 in a colloid dispersion mill. The same mixture when shaken in a shaking machine, or an ordinary bottle, gave a viscosity of 3, and when mixed with a blade stirrer such as a malted milk machine, gave a viscosity of 19. Generally speaking, about 1% to 5% of the clay will give a viscosity within the range of 5 to 50 centipoises when mixed with water.

One of the properties of this base exchange clay which differentiates it from any other type of clay is that there must be retained in it a substantial amount of its natural water of hydration in order to give it gel-forming properties. The minimum amount of natural water which would be retained is between 7% and 15% by weight of the clay. For this reason it cannot be dispersed and redispersed as can be done with bentonite. The expression "natural water of hydration" is employed herein to describe the moisture naturally present in the clay. If the moisture naturally present is driven off by heat or otherwise to the point where the clay is substantially dry, then it will be understood that the clay no longer contains its "natural water of hydration." In this case, even if the clay is rehydrated, it does not have the gel-forming properties which it had before the natural moisture was driven off. On the other hand, if the clay is only partially dried at relatively low temperatures, say, around 250° F., or lower, and the amount of moisture removed is such that 10% or more still remains after the drying operation, then it will be understood that the clay still contains a substantial amount of its natural water of hydration. The reason for a low maximum temperature in drying is that it tends toward a minimum disturbance of the water in chemical combination with the clay, and therefore, allows the clay to retain a large amount of its water of hydration. While water of hydration is left in the clay even when it is dried at 1000°, the amount is not sufficient to allow the clay to gel and apparently the molecular structure including water has been disturbed so that the clay no longer has colloidal characteristics.

Another peculiar characteristic of this clay is its ability to be dispersed to form a gel in the presence of salt solutions. As an illustration, separate mixtures of bentonite and the base exchange clay herein referred to were made by adding to the respective clays a 43% solution of sodium thiosulphate. Each mixture consisted of 8.75 grams of clay in 100 cc. of water solution. The viscosity of the bentonite mixture was zero, while that of the Florida-Georgia fuller's earth mixture was 16.5 centipoises, Stormer. The bentonite mixture started settling immediately and settled 36% in two hours, whereas, the other mixture remained as a suspension during the 24 hours of the test. This ability of the base exchange type of clay to disperse in salt type solutions makes available the combination of parasiticidal salt solutions with a sticking agent which insures the retention of the soluble salt on the foliage. Examples of these solutions are copper sulphate, copper chloride, zinc sulphate, sodium chloride, sodium sulphides, sodium thiosulphate, calcium sulphides, etc. It is obvious that without the application of the solution to foliage as a dispersion of the base exchange clay, the solution would be washed off with the first rain.

It is sometimes desirable to control the pH of the spraying solution, and this is easily done with our base exchange clay without harming the suspension, since it has the ability to disperse in various types of media over a wide pH range, this range being approximately from pH 3 to pH 13. The material has no causticity and, therefore, is a great improvement over the lime type of material now used. Moreover, there is no loss of sulphur due to chemical action when sulphur is combined with this type of clay. Since the material may be mixed in water having an appreciable salt content, there is no decrease in gel value when the material is dispersed in mineralized waters so often found in the field. Another advantage of this type of clay resides in the fact that it may be stimulated as to gel value by the addition of any of a number of stimulating agents, for example, inorganic bases, either added to the dry powder before dispersing, or after dispersing in water. Some of these stimulating agents are calcium hydroxide and sodium hydroxide.

In accordance with the present invention, parasiticidal compositions are prepared containing both water soluble parasiticidal agents, for example, any one of the salts mentioned above, and also water insoluble parasiticidal agents, such as sulphur. This is accomplished in one of several ways. A dusting composition may be prepared by mixing any one of the water soluble parasiticidal agents mentioned above with sulphur and a Florida-Georgia clay of the type previously described containing a substantial amount of its natural water of hydration. This composition may then be applied as a dust, or it may be dispersed in water, whereupon the gel-forming properties of the clay will produce a suspension suitable for application by spraying. The compositions may also contain in addition to water soluble salts such as copper sulphate, copper chloride, etc., water insoluble substances such as sulphur, and the Florida-Georgia clay, a stimulating agent of the type previously mentioned, such as, for example, calcium hydroxide, magnesium oxide and sodium hydroxide. Additionally, the composition may contain, besides the sulphur, other insoluble parasiticides, such as, for example, lead arsenate, copper arsenite, and the like.

The gel formed by dispersion of a base exchange clay of the type herein described makes an excellent suspending means for insoluble parasiticides. The parasiticidal agent may be mixed with the base exchange clay before dispersing or may be stirred into the gel after dispersion.

Parasiticidal compositions made with this base exchange clay have great advantages when used as a medium for dusting. Since this clay weighs only 36 lbs. per cu. ft., it gives nearly two times the filler characteristic of bentonite and yet it retains the advantage of sticking to the foliage treated. Furthermore, parasiticidal mixtures of this clay with insoluble materials such, for example, as sulphur, give much softer grinding mixtures than are obtained with other clays, such as bentonite.

Other features and advantages of the invention will appear from the following description and the accompanying drawing, in which:

Figure 1 represents diagrammatically one form of apparatus which may be used in accordance with this invention for preparing parasiticidal materials;

Figure 2 represents a modified form of apparatus;

Figure 3 represents another form of apparatus which may be used in practicing the present invention; and Figure 4 illustrates another form of apparatus which may be used in accordance with this invention.

Referring to Figure 1, the apparatus described is designed primarily for preparing a parasiticidal composition of clay, as herein described, and sulphur. The apparatus shown comprises a sulphur bin 10, a clay bin 12, a melting tank 14 for melting the sulphur and comprising a heating coil 16, an agitator 18, a water line 20 provided with a valve 22 and an outlet line 24. Outlet line 24 is provided with a valve 26 and is connected through by-pass lines or conduits 28 and 30 to a pump 32. Line 28 is controlled by valve 34 and line 30 by a valve 36.

Line 24 connects to the inlet side of a dispersion mill 38 which may be of the type shown in U. S. Patent No. 2,044,757. Dispersion mill 38 is provided with a conduit 40 through which steam may be introduced and which is controlled by valve 42. Connected to mill 38 is a water line 44 through which water may be pumped by pump 46 to mill 38. The contents of mill 38 may be discharged through outlet pipe 48 and spray nozzle 50 to a chamber 52 provided with a fan 54 and emptying through an outlet 56 to a separating chamber 58 where fine material and coarse material may be separated by a screen 60, the fine material passing to compartment 64 and the coarse material remaining in compartment 62. If desired, the coarse material in compartment 62 may be returned to vessel 14 by any suitable means. Compartments 62 and 64 are provided with outlets 66 and 68, respectively.

According to this method of operation, sulphur is introduced into the system from storage vessel 10 and the base exchange zeolitic clay from storage vessel 12. The two ingredients are brought together in the proper proportions in melting tank 14, the temperature of heating coil 16 in said tank being sufficiently high to melt the sulphur and preferably within the range of about 125° C. to about 140° C. Water is introduced through conduit 20 controlled by valve 22 and super-atmospheric pressure is maintained in vessel 14, the pressure required being approximately 45 lbs. per sq. in. or higher. Under these elevated temperatures and pressures the molten sulphur and the clay are mixed with the water by means of a suitable agitator 18. Thereafter the mixture is passed through conduit 24 controlled by valve 26 to dispersion mill 38 which likewise may be maintained under elevated temperatures and pressures sufficient to keep the sulphur in its molten state and to prevent boiling of the water. Instead of flowing the mixture by gravity into dispersion mill 38, it may be desirable, particularly where the mixture is heavy or viscous, to close valve 26 and open valves 34 and 36, thereby permitting the mixture to be pumped by means of pump 32 into dispersion mill 38.

The desired temperature in mill 38 may be maintained by means of superheated steam introduced through conduit 40 controlled by valve 42. Additional water may be added to mill 38 by pulling through conduit 44 with pump 46.

After the clay and sulphur have been thoroughly dispersed in the water or other liquid medium, the dispersion is passed through an outlet 48 at the exhaust end of the mill and an atomizing vent 50 through which the mixture is expanded in the form of a fine mist in tower 52. It will be recognized that a comparatively small drop in temperature solidifies the sulphur and this may be aided by a fan 54. The intimate mixture of sulphur and clay falls into the cooling receptacle in small particles. It is sometimes desirable to exhaust the mixture into a cooling and drying medium. The majority of the material obtained in this manner is fine enough to be suspended in water for spraying purposes, and thus grinding subsequent to the combination of the clay and sulphur is not necessary. If the percentage of clay is high compared to the percentage of sulphhr in the mixture, more drying effect is required in the atomization stage and a softer particle results. However, the opposite is true and a high percentage of sulphur compared to the percentage of clay gives a harder particle. The particle in any case is softer on the other hand than the particle obtained where bentonite is used instead of the base exchange clay. Sometimes it is desirable to screen the particles obtained and recirculate particles above a predetermined size for subsequent reprocessing. This may be accomplished by passing the clay-sulphur mixture through screen 60 in vessel 58, the fine mixture being recovered in compartment 64 and removed through outlet 68, and the coarser portion of the mixture remaining in compartment 62 from which it can be removed through outlet 66 and returned to the system for further processing. This coarser mixture may be returned either to tank 14 or dispersion mill 38. Instead of returning the larger particles to the system, they may be ground, if desired. In some instances it may be desirable to incorporate an agent in the sulphur-clay mixture which has a high vapor pressure that will give rapid drying upon exhaustion from the mill 38 through atomizing vent 50.

It will be understood that the amount of water introduced into the system through conduit 20, conduit 44 or steam line 40 is subject to variation and may be relatively small so that to outward appearances the mixture in tank 14 and in dispersion mill 38 is substantially a mixture of clay and molten sulphur. We have found, however, that for this particular clay the amount of water introduced into the system must be such as to prevent the vaporization of the natural moisture content of the clay below about 7%. The pressure in tank 14 and dispersion mill 38 may be developed partially by vaporization of the natural moisture in the clay, particularly where the amount of clay is relatively large, but usually it will be necessary to add water, steam or some other convenient means for forming vapor pressure either in tank 14 or dispersion mill 38, or both, in order to prevent excessive dehydration of the clay. In some cases it may be desirable to add a gas in order to increase the vapor pressure.

In the modified apparatus shown in Figure 2, a sulphur boiler 110 is connected through line or conduit 112 to a tower 114 surrounded by a jacket 116. A chamber 118 is provided at the upper extremity of the tower to hold clay which is passed into tower 114 through a vibrating screen 120. Clay may be introduced into chamber 118 through opening 122. Zone 124 is a cooling zone in the lower part of tower 114. The upper part of tower 114 is connected through line or conduit 126 to a suction fan 128 which in turn is connected through conduit 130 to a condenser 132. Condenser 132 is connected through conduit 134 to pump 136 which in turn is connected to sulphur boiler 110 through conduit 138. Outlet 140 is provided to remove the contents of tower 114.

According to this method, the sulphur is vaporized and while in vapor form is brought into contact with the clay and condensed thereon. This may be accomplished by vaporizing sulphur in boiler 110 and passing the vaporized sulphur through conduit 112 to a point near the bottom of a wedge tower 114 so that the sulphur vapors will rise through base exchange zeolitic clay which may be introduced through opening 122 to chamber 118 and thence through vibrating screen 120 to the top of the tower. The rate of settling of the clay through the tower determines the proper rate of sulphur flowing upwardly through the tower. In addition to this, the total quantities of clay and sulphur are determining factors as to the rate of flow of the two materials in the tower. The vapors may be exhausted continuously from the top of the tower through conduit 126 by means of suction fan 128 and recirculated through conduit 130 to a condensing zone 132 from which the condensed material is passed through conduit 134 to a suitable pump 136 which returns it through conduit 138 to the vaporizing zone 110. This system of circulation may be carried out continuously or semi-continuously. It is usually desirable to heat the clay in the tower to prevent too rapid condensation of the sulphur vapors, and this heat may be varied through the length of the tower, for example, by passing a heat medium through a jacket 116. Thus, the clay in the part of the tower where the sulphur vapor enters may be heated to a higher temperature than that at the far end of the unit and the temperature may be graded downwardly from the sulphur entrance to a cooling zone 124. It has been found that this is a very efficient method for intimately incorporating the sulphur into the clay. The efficiency of the mixture also depends upon the fineness of the clay being treated. One of the advantages of this method is that it eliminates the necessity for re-grinding the sulphur-clay mixture, since the mixture which is recovered through outlet 140 is ready for use.

Another modification is illustrated in Figure 3 in which sulphur boiler 210 is connected through conduit 212 to tower 214. A pulverizer 216 is connected through a conduit or line 218 to a blower 220 which in turn is connected by means of a conduit or line 222 to the upper portion of tower 214. In the upper extremity of tower 214 is a conduit 224 leading to a condenser 226 which is connected through a conduit 228 to a blower 230 which in turn is connected through a conduit 232 to sulphur boiler 210. In the lower portion of tower 214 is a cooling zone 234 and at the lower extremity is an outlet 236. The operation of this system is similar to the operation of the system just described except that the clay is pulverized in a pulverizer 216 then passed through conduit 218 and blown through conduit 222 to the upper portion of tower 214, which it enters through opening 238. Thereafter the pulverized clay mingles with sulphur vapors introduced into tower 214 from sulphur boiler 210 through conduit 212. Any sulphur vapors escaping through the top of the tower are recirculated through conduit 224 by condensing them in condenser 226 and passing them through conduit 228 to blower 230, which returns them through conduit 232 to sulphur boiler 210.

In Figure 4 the apparatus illustrated comprises a rotating kiln mixer 310 provided with a sulphur vapor outlet line 312 connected to a condenser 314, which in turn connects through conduit 316 to a pump 318. From pump 318 a conduit 320 connects to a sulphur boiler 322. Another conduit 324 leads from sulphur boiler 322 to rotary kiln mixer 310. In this system the sulphur is vaporized in boiler 322, passed through conduit 324 to rotary kiln mixer 310 and there mixed with clay introduced through hopper 326. Rotary kiln 320 is provided with baffles of any suitable type and in this manner the clay and the sulphur can be thoroughly mixed, the mixture being discharged through a suitable outlet to a receptacle 328 and any unmixed sulphur vapors being returned through conduit 312, condenser 314, conduit 316, pump 318 and conduit 320 to sulphur boiler 322. The same factors of flow of sulphur vapors and clay apply as with the wedge tower 114 in Figure 2. This type of arrangement is excellent for maintaining a gradual temperature drop from the inlet end of the kiln downwardly toward the outlet end.

It will be understood that in the procedures described with reference to Figures 2, 3 and 4, water may always be introduced into the system at any convenient point in order to prevent dehydration of the clay below 10% water. It will be appreciated that these systems may also be used in making parasiticidal materials from other types of clays or filler materials.

Generally speaking, the practice in using this new type of clay which we have discovered conforms to the present use of such materials in so far as the proportions are concerned. Where the clay is to be used as a suspending agent in the form of a water dispersion, the addition of 5% of clay on the weight of the water to be used gives excellent results.

The mixture may be placed in a sprayer tank accompanied by agitation to secure dispersion. The clay does not hydrate so rapidly that clotting or lumping occurs. Another convenient way to mix the solid material with water is to connect the outlet of a hopper type vat mixer to the outlet of the pump and allow the outlet of the vat mixer to empty into the tank. The water from the tank is pumped through the mixer and the clay added to the stream in the hopper. When the desired amount of clay has been added, a few cycles through the vat mixer and pump will make a good dispersion. The pump outlet is then connected to the spray nozzle.

A typical sulphur spray mix is:

| | | |
|---|---|---|
| Fine sulphur | pounds | 5 to 40 |
| Base exchange zeolitic clay | do | 40 |
| Water | gallons | 100 |

In this case the amount of base exchange zeolitic clay may be decreased if a thinner mixture is desired due to the bulk of the sulphur present.

If small quantities of sulphur and base exchange zeolitic clay are desired but the same viscosity is to be maintained, the following is a typical formula:

| | | |
|---|---|---|
| Hydrated lime | pounds | 0.5 |
| Sulphur | do | 20 |
| Base exchange zeolitic clay | do | 20.0 |
| Water | gallons | 100 |

The base exchange zeolitic clay of the Florida-Georgia type has excellent sticking qualities when deposited on foliage and holds the sulphur in situ. When it is desired to hold very small concentrations in contact with the foliage, a small amount of starch, dextrine or casein material may be added.

If it is desired to make a concentrated dispersion for shipment in the liquid form, the base exchange clay may be used with water in the ratio of 1 part base exchange clay to 4 parts of water, plus the parasiticide which is to be incorporated therein. In making this type of mixture, complete hydration of the clay is of great importance, and this is best accomplished by violent agitation. Such a mixture can be added to the user's sprayer tank with comparatively little stirring required.

We have found that the use of a dispersion mill to make an intimate mixture of this base exchange clay and parasiticide in water is very effective. The mill shown in Patent No. 2,044,757 is excellent for this purpose. In making such dispersions, the clay and parasiticide may be premixed and added to the water prior to feeding into the mill, or all may be fed into the mill simultaneously. When making this type of mixture with sulphur, sublimed sulphur seems to be the best type although finely ground material will sometimes suffice. In making fresh water emulsions, a mill is necessary. There are many materials which are immiscible with water but which have an excellent parasiticidal effect. Examples of such materials are chlorinated paraffin and various hydrocarbon compounds such as kerosene, gasoline and even crude oil. A typical composition which may be made from such materials in accordance with the present invention is illustrated as follows:

Insecticidal agent _____ gallons__ 2
Base exchange zeolitic clay ____ pounds__ 40 to 60
Water _____ gallons__ 100

The mass is then run through a dispersion mill. In this type of composition the base exchange zeolitic clay has been found to be a greatly superior emulsifying agent giving a smooth creamy mixture. As already indicated, it is some times desirable to make a combination of emulsion with a saline solution and a clay of the type herein described is excellent for this purpose.

The ease of making a suspension with a minimum amount of mixing is greatly increased by the addition of a salt to a mixture of sulphur with a clay of the type herein referred to. An example of such a mixture is as follows:

Pounds
Base exchange clay _____ 5
Sodium chloride _____ 1
Sulphur _____ 5
Water _____ 100

This mixture will form a colloidal suspension by short mixing in a stirring apparatus.

The foregoing parasiticidal compositions containing salts such as sodium chloride, together with the Florida-Georgia type of clay, and sulphur, may also contain in addition water soluble parasiticidal agents such as, for example, copper sulphate and/or other water soluble parasiticidal salts of the type previously described.

It has been found that a mixture of a clay of the type herein described and sulphur heated to above the melting point of sulphur, for example, to a temperature of, say, 250° F. gives a produce superior to that obtained by mixing bentonite with sulphur in the same manner. The mixture of base exchange zeolitic clay and sulphur upon cooling is soft and easily ground, whereas, the mixture with bentonite is very hard and is very difficult to grind. The advantages of the Florida-Georgia type of clay in this case are not only decreased grinding difficulties, but an increased ease of reaching small particle size which easily disperses with water. The addition of a small amount of sodium chloride to the mixture before heating results in a final product which has suspension characteristics far superior to the suspension characteristics of the mixture without the salt. Other salts of the class of sodium chloride may be used for this purpose. The addition of salts of the sodium chloride type is also of advantage in mixtures of fuller's earth, sulphur and other agents such as lead arsenates, copper compounds, etc. Generally speaking, among the salts which may be used are the alkali metal salts, including sodium chloride and potassium chloride, the soluble alkaline earth metal salts, including calcium chloride and other water soluble salts.

In accordance with the invention, parasiticidal compositions containing sulphur in some instances are prepared with added light absorptive pigment materials. Among the materials which may be employed for this purpose are, for example, carbon, carbon black, iron oxide and other similar light absorptive but inexpensive pigments. It has been found that such materials are compatible with clays of the Florida-Georgia type and their presence in compositions containing the Florida-Georgia type clays of the type herein described, and sulphur, results in improved parasiticidal compositions, because the heat given off by the light absorptive substances materially assists in vaporizing the sulphur. At the same time the Florida-Georgia type clay herein described is an excellent suspending agent not only for the sulphur, but for the light absorptive material or pigment. The addition agents can also comprise dark colored paint pigments, and according to one form of the invention, the sulphur itself is dyed. The dyes may be in the form of Bismarck brown, various violets and blues, as well as some black. Even though the sulphur itself is not actually dyed, the presence of the dye will cause the absorption of light and heat.

It will be understood that many variations may be made in the nature and proportions of material which may be employed in making parasiticidal compositions in accordance with this invention regardless of whether these compositions are in powder form to be applied by dusting, or in the form of emulsions or suspensions to be applied by spraying.

Having thus described the invention, what we claim as new and desire to secure by Letters Patent of the United States is:

1. A toxic composition comprising an intimate mixture of fuller's earth of the Florida-Georgia type and sulphur, the fuller's earth containing a substantial amount of its natural water of hydration.

2. A toxic composition comprising an intimate mixture of fuller's earth of the Florida-Georgia type, sulphur and a light absorptive pigment, the fuller's earth containing a substantial amount of its natural water of hydration.

3. A toxic composition comprising an intimate mixture of fuller's earth of the Florida-Georgia type, sulphur and an inorganic base capable of acting as a gel stimulating agent for the fuller's earth, the fuller's earth containing a substantial amount of its natural water of hydration.

4. A parasiticidal spray composition comprising a dispersion in water of fuller's earth of the Florida-Georgia type and sulphur, the fuller's earth containing a substantial amount of its natural water of hydration.

5. A toxic composition comprising a dispersion in water of fuller's earth of the Florida-Georgia type, sulphur and a light absorptive pigment, the fuller's earth containing a substantial amount of its natural water of hydration.

6. A toxic composition comprising a dispersion in water of fuller's earth of the Florida-Georgia type, sulphur and an inorganic base capable of acting as a gel stimulating agent for the fuller's earth, the fuller's earth containing a substantial amount of its natural water of hydration.

7. A toxic composition comprising a substantial quantity of a fuller's earth of the Florida-Georgia type and a substantial quantity of sulphur intimately mixed together, the fuller's earth containing its natural water of hydration in an amount corresponding to at least 7% by weight thereof and being of such natural particle fineness that when dispersed in water in quantities of about 5% it will produce a dispersion having a viscosity greater than about 5 centipoises.

8. The method of preparing a toxic composition containing sulphur which comprises mixing a Florida-Georgia type clay containing a substantial amount of its natural water of hydration with the sulphur, and maintaining a substantial amount of the natural water of hydration in said fuller's earth during the mixing operation.

9. The method of preparing a parasiticidal material which comprises mixing a fuller's earth of the Florida-Georgia type containing a substantial amount of its natural water of hydration with molten sulphur under a pressure sufficient to retain a substantial quantity of said natural water of hydration in the mixture and reducing the molten mixture to a fine state of subdivision.

10. The method of preparing a parasiticidal material which comprises mixing a fuller's earth of the Florida-Georgia type containing a substantial quantity of its natural water of hydration with molten sulphur in the presence of steam under pressure and releasing the mixture through an atomizing means, the pressure of the steam being sufficient to maintain at least 7% of the natural water of hydration in the fuller's earth.

11. The method of preparing a parasiticidal material which comprises subliming sulphur and controllably condensing the sulphur vapors on a fuller's earth of the Florida-Georgia type, the fuller's earth containing a substantial amount of its natural water of hydration.

ROY CROSS.
MATTHEW FORBES CROSS.
WALTER M. CROSS, Jr.

CERTIFICATE OF CORRECTION.

Patent No. 2,304,749. December 8, 1942.

ROY CROSS, ET AL.

It is hereby certified that error appears in the printed specification of the above numbered patent requiring correction as follows: Page 3, first column, line 65, for "pulling" read --pumping--; page 5, first column, line 29, for "paraffin" read --paraffins--; and that the said Letters Patent should be read with this correction therein that the same may conform to the record of the case in the Patent Office.

Signed and sealed this 16th day of February, A. D. 1943.

Henry Van Arsdale,
(Seal) Acting Commissioner of Patents.